(12) United States Patent
Takeda

(10) Patent No.: US 6,179,604 B1
(45) Date of Patent: Jan. 30, 2001

(54) VALVE GATE DEVICE FOR USE IN AN INJECTION MOLD

(75) Inventor: Yoshinobu Takeda, Niigata (JP)

(73) Assignee: Mitsubishi Materials Corporation, Tokyo (JP)

( * ) Notice: Under 35 U.S.C. 154(b), the term of this patent shall be extended for 0 days.

(21) Appl. No.: 09/041,306

(22) Filed: Mar. 12, 1998

(30) Foreign Application Priority Data

Feb. 13, 1998 (JP) .................................................. 10-031870

(51) Int. Cl.[7] .............................. B29C 45/23; B29C 45/74
(52) U.S. Cl. .......................... 425/547; 425/552; 425/563; 425/564
(58) Field of Search .................................. 425/562, 563, 425/564, 565, 566, 547, 552

(56) References Cited

U.S. PATENT DOCUMENTS

| | | |
|---|---|---|
| 4,521,179 | * 6/1985 | Gellert .................................. 425/552 |
| 4,826,641 | 5/1989 | Takeda et al. . |
| 4,882,117 | 11/1989 | Takeda et al. . |
| 5,882,693 | * 3/1999 | Silkowski et al. .................... 425/564 |

FOREIGN PATENT DOCUMENTS

| | | |
|---|---|---|
| 2-243314 | 9/1990 | (JP) . |
| 10-15995 | 1/1998 | (JP) . |
| 91/18727 | * 12/1991 | (WO) .................................. 425/564 |

* cited by examiner

Primary Examiner—Tim Heitbrink
(74) Attorney, Agent, or Firm—Oblon, Spivak, McClelland, Maier & Neustadt, P.C.

(57) ABSTRACT

An injection molding method, an injection mold and a valve gate device, in which a movable pin moves easily, without excess force being exerted thereto, to properly open and close a gate. Closing a gate 10B by a cylindrical movable pin 27 allows excess resin to easily return back to a resin conveying path side through an outer edge portion at the end of the movable pin 27, so that even a large-diameter gate 10B can be reliably closed by the movable pin 27 which can be easily moved due to reduced resin resistance on the movable pin 27.

5 Claims, 3 Drawing Sheets

VALVE GATE DEVICE FOR USE IN AN INJECTION MOLD

BACKGROUND OF THE INVENTION

1. Field of the Invention

The present invention relates to an injection molding method, an injection mold and a valve gate device including a movable pin (valve pin) for opening and closing a gate.

2. Description of the Related Art

In a known injection mold of this type, a cavity is formed between a stationary mold plate and a movable mold plate, and a valve body with a resin-conveying path communicates with the cavity through a gate within the stationary mold plate. In addition, a movable pin is movable in an axial direction thereof in the resin-conveying path of the valve body, with one end of the movable pin used for opening and closing the gate.

SUMMARY OF THE INVENTION

In the conventional injection mold, in order to supply a larger amount of resin into the cavity or to supply the resin into the cavity with a greater speed, the diameter of-the gate is increased. However, when the diameter of the gate is increased and an attempt is made to close the large-diameter gate with the movable pin, the resin offers a large resistance to the movable pin, which prevents the gate from being easily closed.

It is therefore an object of the present invention to provide an injection molding method, an injection mold and a valve gate device, wherein the movable pin moves easily, without excess force being exerted thereto, so that it properly opens and closes the gate.

According to an aspect of the invention, the above and other objects are carried out by an injection molding method for producing a molded product by supplying resin into a cavity formed between a pair of mold plates, through a gate, wherein after supplying the resin into the cavity with one end of a supporting pin facing the center portion of the gate, the gate is closed by a cylindrical movable pin disposed around the supporting pin in order to form the molded product in the cavity.

Closing the gate with a cylindrical movable pin causes excess resin to easily return towards the resin-conveying path through the outer edge portion at one end of the supporting pin. Therefore, even a large-diameter gate can be reliably closed by the movable pin which moves easily due to reduced resin resistance on the movable pin.

According to another aspect of the invention, the injection mold having a cavity between a pair of mold plates in order to supply resin into the cavity through a gate, wherein one end of a supporting pin is disposed at the center portion of the gate and a cylindrical movable pin for opening and closing the gate is provided around the supporting pin so as to be movable along an axial line of the movable pin. Opening and closing the gate by a movable pin supported and guided by the supporting pin allows the movement of the movable pin to be stabilized and reduces the resin resistance on the movable pin, allowing the movable pin to move easily.

According to yet another aspect of the invention, the valve gate device uses an injection mold having a cavity between a pair of mold plates in order to supply resin into the cavity through the gate, the valve gate device comprising a valve body having a resin-conveying path which communicates with the cavity through the gate, a supporting pin having one end facing the center portion of the gate. A cylindrical movable pin for opening and closing the gate is provided around the supporting pin so as to be movable along an axial line of the movable pin. Opening and closing the gate with a cylindrical movable pin supported and guided by the supporting pin reduces the resin resistance on the movable pin, making it easier to open and close the gate.

According to yet another aspect of the invention, the valve gate device further comprises biasing means which bias the supporting pin towards the one end side. When the pin (core pin) opposing the supporting pin is placed at the movable mold side, the biasing means allows both pins to easily and closely abut against each other.

According to yet another aspect of the invention, the valve gate device comprises cooling means provided at the supporting pin for cooling the supporting pin. Cooling the supporting pin by a cooling means reliably prevents overheating of the supporting pin.

BRIEF DESCRIPTION OF THE DRAWINGS

A description will now be given of an embodiment of the present invention with reference to the drawings, in which.

DETAILED DESCRIPTION OF THE PREFERRED EMBODIMENT

Figure 1:
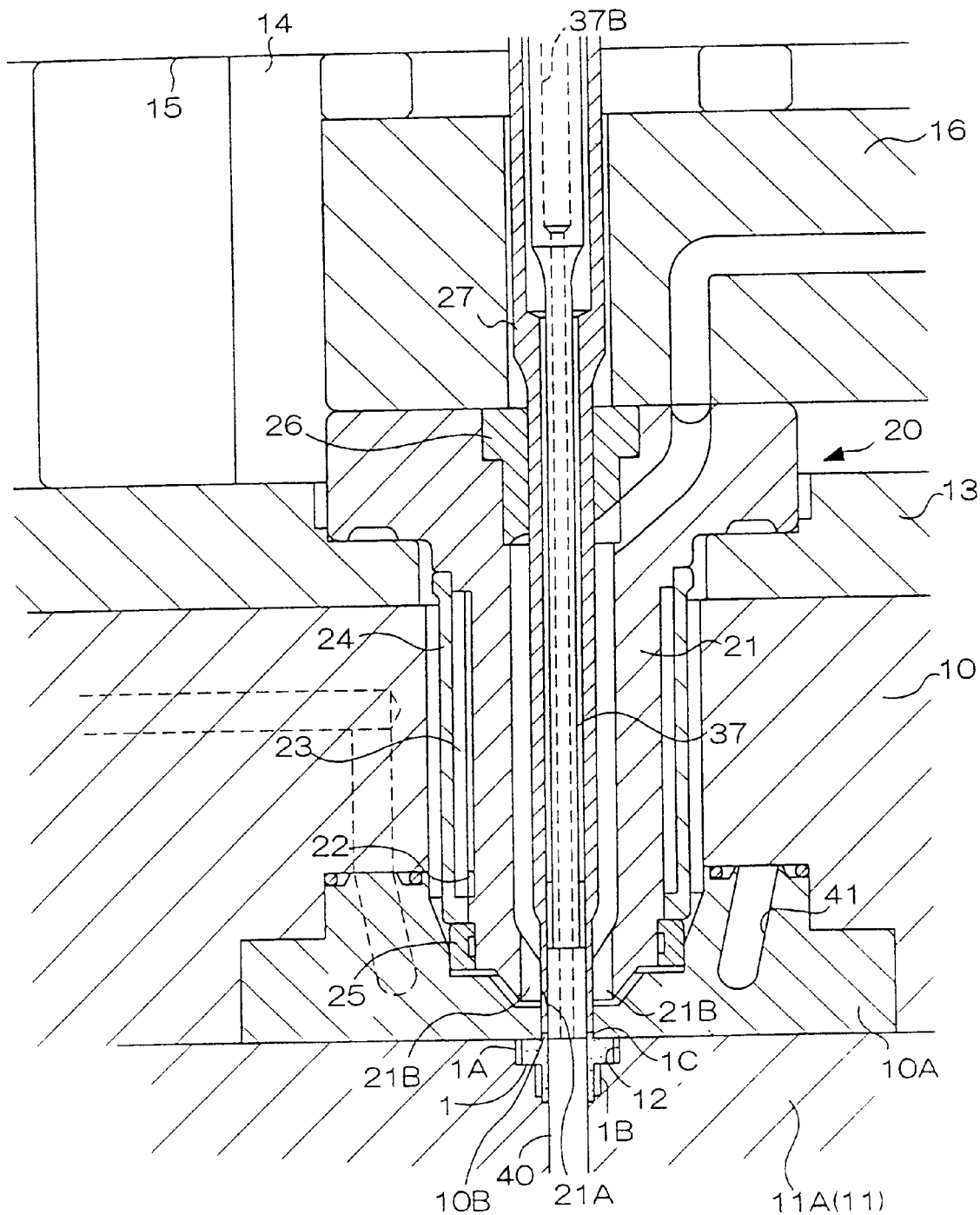
FIG. 1 is a sectional view of the main portion of a hot-runner mold.
Figure 2:
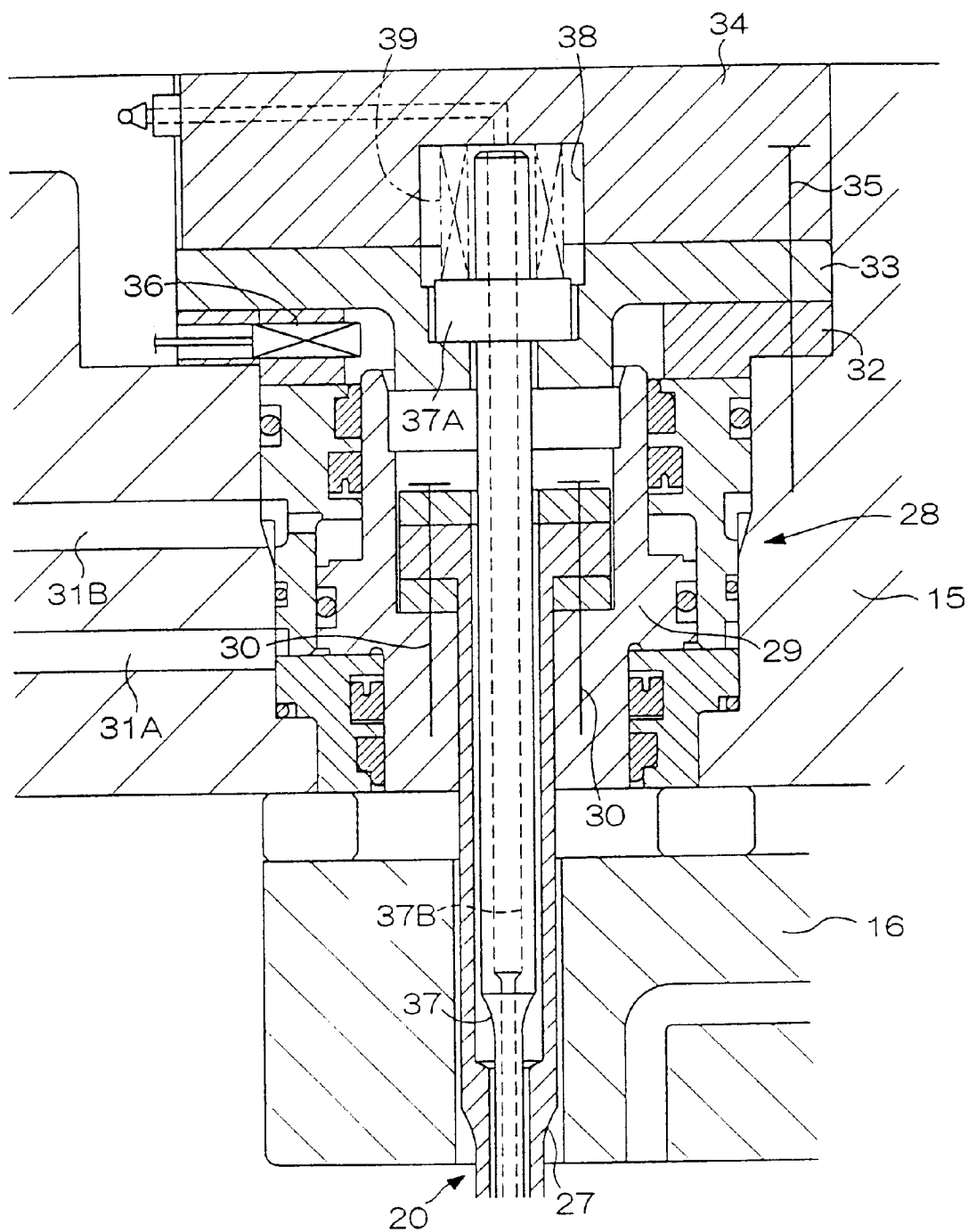
FIG. 2 is a sectional view showing the stationary mounting plate (injection machine) side of FIG. 1.
Figure 3:
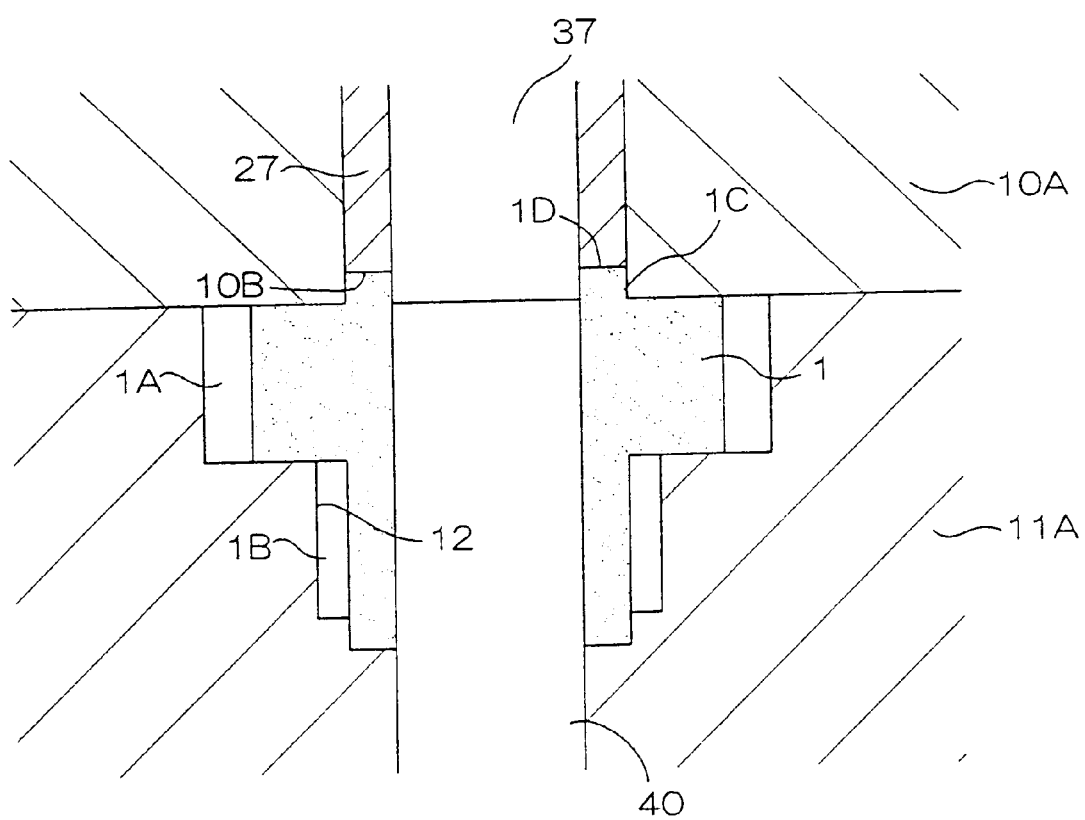
FIG. 3 is a sectional view of the cavity portion.

The injection mold used for molding resin into a hollow gear 1 having a large gear portion 1A and a small gear portion 1B is shown in FIGS. 1 –3.

In FIG. 1, a movable mold plate 11 is provided so that it can move freely towards and away from a stationary mold plate 10. Inserts 10A and 11 A are provided at the mold plates 10 and 11, respectively. A cavity 12 is formed between the inserts 10A and 11A for producing the gear 1 by molding. A stationary support plate 13 and a stationary mounting plate 15 are mounted to the stationary mold plate 10, with the stationary mounting plate 15 being mounted through a spacer block 14. A manifold 16 is disposed between the stationary support plate 13 and the stationary mounting plate 15. A valve body 21 of a valve gate device 20 is provided within the stationary mold plate 10, the insert 10A and the stationary support plate 13. A temperature sensor 22 and a heater 23 are provided at the outer periphery of one end of the valve body 21. A heater cover 24 is provided at the outer periphery of the heater 23, and a seal ring 25 is provided at the one end of the valve body 21. In the interior of the one end of the valve body 21 are provided four resin-conveying paths 21B at equal intervals at an inner peripheral wall 21A defining a circular through hole. Molten resin is supplied to the cavity 12 by allowing it to pass through a sprue bush (not shown), the manifold 16, the valve body 21 and a gate 10B formed at the insert 10A.

A closing member 26 is internally provided in the upper portion of the valve body 21. A movable pin 27 supported and guided by the inner portion of the closing member 26 and the inner peripheral wall 21A in one end of the valve body 21 is capable of sliding along an axial line thereof. The manifold 16 and the stationary mounting plate 15 surround the base end side of the movable pin 27. The base end portion of the movable pin 27 is mounted to a piston 29 of a fluid pressure cylinder 28 provided within the stationary mounting plate 15 by a mounting bolt 30. A fluid is supplied to the fluid pressure cylinder 28 through two fluid paths 31A and 31B formed in the stationary mounting plate 15, whereby the piston 29 is moved along with the movable pin 27. First, second and third mounting members 32, 33, and 34 are mounted to the stationary mounting plate 15 by a mounting bolt 35 in order to affix the fluid pressure cylinder 28. A proximity switch 36 is provided at the first mounting member 32 in order to detect any movement of the piston 29. A supporting pin 37 is provided in the movable pin 27 so as to be freely movable along an axial line thereof, with the base end portion of the supporting pin 37 being disposed in a space 38 defined by the second and third mounting members 33 and 34. A spring (biasing means) 39 that biases the supporting pin 37 towards one end is provided between a flange portion 37A at the base end portion of the supporting pin 37, and the third mounting member 34. A center hole 37B is formed in the supporting pin 37. The end of the supporting pin 37 is cooled by supplying compressed air to the end of the supporting pin 37 through the center hole 37B. The supporting pin 37 may instead be cooled by air using a heat pipe, etc. When a heat pipe is used, or when the inside of the supporting pin 37 is formed into a double path structure to circulate compressed air, the end of the center hole 37B in the supporting pin 37 is closed.

The gear 1 formed in the cavity 12 has an annular protrusion 1C at the side face located towards the large gear portion 1A. A side face 1D of the protrusion 1C is formed by molding by the end face of the movable pin 27. The side face 1D is the gate face. The inner peripheral surface of the gear 1 is formed by molding by a core pin 40 provided at the movable mold plate 11, and the supporting pin 37. Reference numeral 41 denotes a cooling path for cooling the insert 10A.

In the injection mold having the above-described structure, the fluid pressure cylinder 28 is operated to move the movable pin 27 along the axial line thereof such that the end of the movable pin 27 opens and closes the gate 10B of the insert 10A. In this case, the movable pin 27 moves while being supported and guided by the supporting pin 37 so that easy movement of the movable pin 27 can be ensured. In addition, since the movable pin 27 closes the annular gate 10B, allowing excess resin which cannot be conveyed into the cavity 12 to easily return from the outer edge portion at the front end of the movable pin 27 to where resin is allowed to accumulate in the valve body 21, the gate 10B can be easily closed as a result of reduced resin resistance on the movable pin 27. Therefore, a high quality molded product can be produced within the cavity 12.

When the mold is closed, the supporting pin 37 and the core pin 40 abut against each other. In this case, the supporting pin 37 is biased by the spring 39. Thus, even if the pins 37 and 40 are made to abut against each other with too large a force, the shock produced thereby is absorbed by the spring 39, thereby preventing the pins 37 and 40 from becoming damaged. In addition, while the pins 37 and 40 abut against each other, the spring 39 biases the supporting pin 37 towards the core pin 40 at all times, so that the pins 37 and 40 are in close contact with each other with no gap formed therebetween. Consequently, no burrs or the like are produced in the molded product since no resin enters from between the pins 37 and 40. On the other hand, when the core pin 40 separates from the supporting pin 37, causing the mold to open, the supporting pin 37 can be efficiently cooled by ejecting compressed air from the end of the supporting pin 37 through the center hole 37B formed in the supporting pin 37.

In the present embodiment, the cylindrical movable pin 27 and the circular gate 10B are used in combination to produce the cylindrical gear 1 by molding. However, the present invention is not limited thereto. Various modifications can be made in the shape of the end surface of the movable pin so as to correspond to various gate shapes.

As can be understood from the foregoing description, closing the gate with a cylindrical movable pin permits excess resin to easily return back towards the resin-conveying path through the outer edge portion at the end of the supporting pin. Therefore, even a large-diameter gate can be reliably closed by the movable pin which is easily moved, due to reduced resistance on the movable pin. Consequently, it is possible to significantly increase the amount of resin that can be supplied to the cavity as well as the speed with which the resin can be supplied to the cavity. In addition, the gate can be easily closed, ensuring production of a high-quality molded product.

Also, opening and closing the gate by a movable pin supported and guided by the supporting pin allows stable movement of the movable pin and reduces the resin resistance on the movable pin to allow easy movement of the movable pin. Consequently, the movable pin allows easy and reliable opening and closing of the gate.

Also, opening and closing the gate with a cylindrical movable pin supported and guided by the supporting pin reduces the resin resistance on the movable pin, making it easier to open and close the gate. Therefore, even when the gate has a large diameter, the resin resistance on the movable pin is small, thereby reliably allowing the movable pin to move in order to close the gate.

When the pin (core pin) opposing the supporting pin is placed at the movable mold side, the biasing means allows both pins to easily and closely abut against each other. Therefore, a high-quality molded product can be easily produced.

Cooling the supporting pin by a cooling means reliably prevents overheating of the supporting pin.

What is claimed:

1. A valve gate device for use in an injection mold having a cavity defined between a pair of mold plates in order to supply resin into the cavity through a gate, said valve gate device comprising:
   a valve body having a resin-conveying path which communicates with the cavity through said gate;
   a supporting pin having one end facing the center portion of said gate;
   a cylindrical movable pin for opening and closing said gate, which is provided around said supporting pin so as to be movable along an axial line of said movable pin; and
   a spring which continuously elastically biases said supporting pin in a direction towards said one end thereof.

2. A valve gate device according to claim 1, further comprising cooling means, provided in said supporting pin, for cooling said supporting pin.

3. A valve gate device according to claim 1, further comprising a core pin positioned such that said spring biases said supporting pin against said core pin.

4. A valve gate device according to claim 2, wherein said supporting pin is hollow and said cooling means comprises flowing a cooling fluid through said hollow supporting pin.

5. A valve gate device according to claim 3, wherein said supporting pin is hollow and said cooling means comprises flowing a cooling fluid through said hollow supporting pin.

* * * * *